United States Patent Office 3,168,251
Patented Feb. 2, 1965

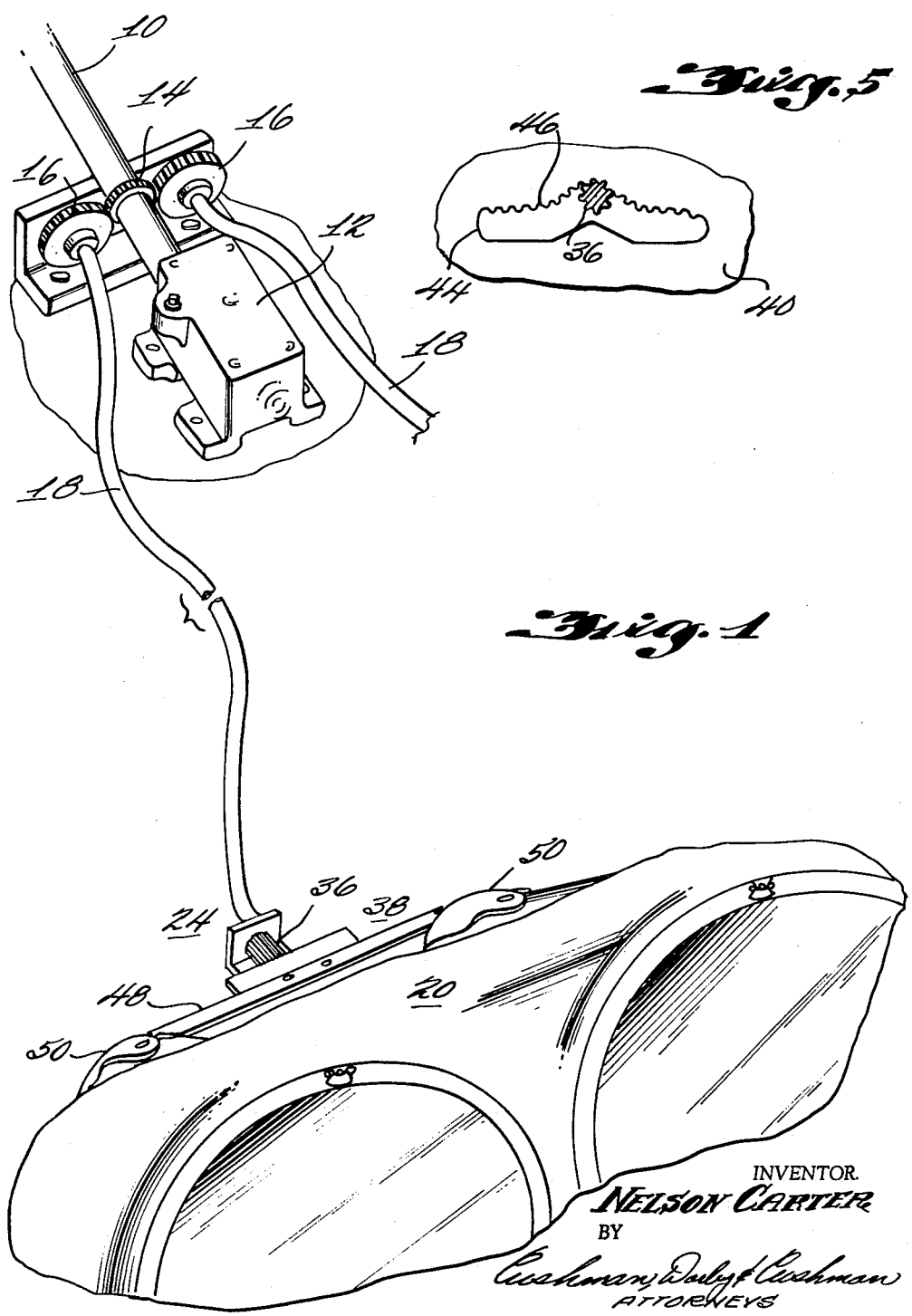

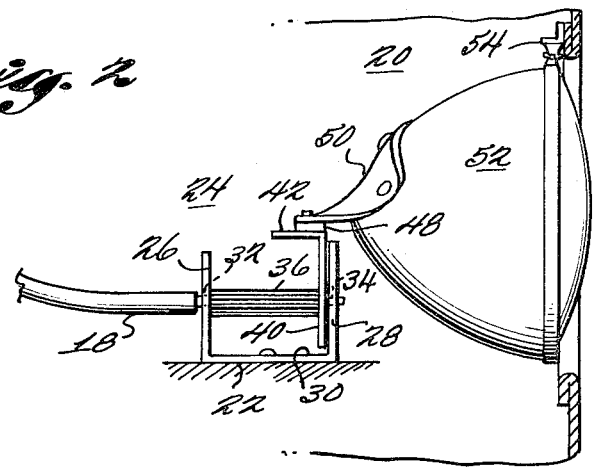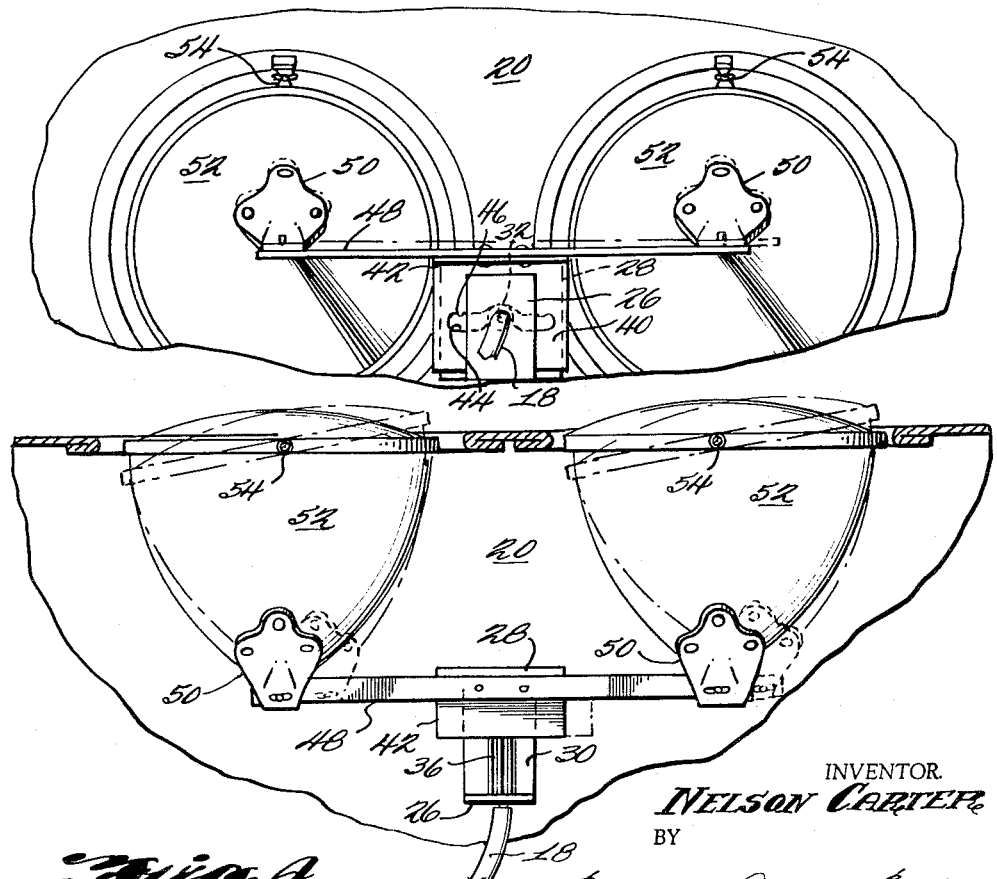

3,168,251
MOVABLE VEHICLE HEAD LAMPS
Nelson Carter, Hiwassee, Va.
Filed Oct. 15, 1962, Ser. No. 230,376
1 Claim. (Cl. 240—62.51)

This invention relates to adjustable automative head lamps and more particularly to an improved control system for automatically positioning the lamps of an automobile as it moves.

A serious highway safety problem is presented under ordinary night traffic conditions due to the glare of headlights blinding the driver of an oncoming car on turns of the road. With fixed head lamps on the automobile, the beams of light from the car on the inside of the turn do not follow the lane in which the car is being directed on the curve, but, rather, extend across the road into the path of an oncoming vehicle traveling on the outside of the curve. This light has the effect of blinding the driver of the oncoming automobile thereby subjecting him to the danger of accident.

Another danger created by conventional systems is the lack of illumination provided drivers whether traveling on the inside or outside of a curve of a roadway. Lacking visibility in his path due to the projection of light beyond the track of the curve, the driver has difficulty in negotiating the curve properly, and he thereby endangers himself and others.

These dangers are somewhat alleviated on conventional head lamp systems by the provision of a switch which may be used to lower the beam of light. However, in many automobiles, the low beams are themselves very intense and are focused at a point appreciably distant from the automobile. As a result, the danger of blinding oncoming drivers remains very serious, and improved visibility for the driver, whether he is traveling on the inside or the outside of the curve, is only slightly improved.

Other prior art arrangements have contemplated the rotation of the lamps in the direction of the turn. This, of course, decreases the danger of blinding oncoming drivers on the outside of the curve and in addition improves the visibility to the driver of the path in which he travels. However, as stated previously, many low beam head lamps are focused appreciably ahead of the automobile. Therefore, the problems described above are not completely eliminated, particularly on sharp curves. These dangers, of course, are increased when the driver has failed to dip his lights from high to low beam.

The present invention improves on the devices of the prior art by illuminating the curve on which the car is traveling and by concentrating the light at a point closer to the automobile than is the case under normal driving in a straight path.

A further object of the invention is to provide a system whereby this is accomplished automatically with a return to normal lighting conditions when the vehicle leaves the turn and enters a straight stretch of highway.

Ancilliary to these preceding objects is the provision of a control system wherein the head lamps are coincidentally moved laterally and vertically when the automobile travels in a curved path.

These and other objects and advantages will be apparent from the following description of the invention, pointed out particularly in the appended claim, when the foregoing are taken in connection with the accompanying drawings of an illustrative embodiment of the invention in which:

FIGURE 1 is a view in perspective of a control system illustrating the arrangement for controlling the head lamps on one side of the vehicle;

FIGURE 2 is a side elevation view of a portion of the system of FIGURE 1 illustrating the arrangement for controlling the precise direction of movement of the head lamps;

FIGURE 3 is an elevation view of the significant portion of the system shown in FIGURE 2 with the positioning of the system during a cycle of operation being shown in chain lines;

FIGURE 4 is a plan view of the portion of the system shown in FIGURE 2 with the positioning of the system during a cycle of operation being shown in chain lines; and FIGURE 5 is a detailed view of a portion of the gear rack which controls the direction of lamp movement.

Briefly summarizing the invention, the rotation of the automobile steering rod is translated through suitable gearing to a gear rack which moves laterally and vertically in response to the steering rod rotation. Connected to this gear rack is the head lamp assembly which appropriately moves about a pivot point in accordance with the gear rack motion to change the point of focus of the beam.

More specifically, a preferred embodiment of the system is illustrated in FIGURE 1. A steering rod 10 is connected to a steering worm assembly 12 which operates in a conventional manner to turn the wheels of the vehicle. Also mounted on the steering rod is a spur gear 14 which rotates with the steering rod. In continuous engagement with spur gear 14 on opposite sides thereof are a pair of gears 16 which rotate in a sense opposite to that of gear 14. Joined to each of the gears 16 is one end of a pair of control cables 18. The opposite ends of the control cables are connected to an arrangement for controlling the direction of movement of the head lamps, this arrangement being shown generally at 20. As is obvious from the drawing, one of the control cables is utilized to control the motion of the head lamp assembly on one side of the vehicle, and the other cable controls the motion on the other side. Since the arrangement on each side of the vehicle is precisely the same, the structure of only one will be described.

The structure of the directional control arrangement 20 may be most clearly described by reference to FIGURES 2–4. Connected to the headlight well 22 by suitable means is a gear bracket 24. This bracket comprises a generally U-shaped member having rear and forward arms 26 and 28 connected by a web 30 which is fastened to well 22. Arms 26 and 28 are provided respectively with aligned apertures 32 and 34. Bracket 24, with the apertures 32 and 34 on opposite sides thereof, serves to journal a pinion 36. This pinion is connected to the other end of one of the control cables 18 previously described. Continuously engaging the pinion between arms 26 and 28 is a gear rack 38. The rack comprises a generally L-shaped member having a main portion 40 and a flange 42. In portion 40 there is machined a curved slot 44 having teeth 46 on the upper edge thereof which rests on the pinion 36 in a mating arrangement immediately adjacent forward arm 28. The contour of the toothed edge may be more clearly seen by reference to FIGURE 5. As can be seen, a concave contour, with respect to the engaging pinion 36, is defined at the central portion of slot 44 with the extremities of the slot extending in a generally horizontal direction. This configurations permits the vertical movement of the head lamps to occur during the initial portion of the turn in a manner to be hereinafter described. Connected to flange 42 is a strap 48, the longitudinal direction of which is normal to the direction of the axis of pinion 36. Pivotally connected to the ends of strap 48 are a pair of brackets 50 which are joined on their opposite ends to head lamps 52 rearwardly of the front portion thereof. These head lamps are pivotally connected at the top thereof, at the front portion of the lamps, to the automobile body by means of a universal joint 54, such as a ball and socket, which firmly holds the lamp in position when the rack and pinion arrangement is motionless, but which allows the lamp to pivot under the control of these members when they are activated.

Although the structure illustrated here employs two head lamps on each side of the automobile, it is apparent that a single lamp may be used by eliminating strap 48 and connecting the lamp through bracket 50 to the flange 42. Similarly, additional head lamps may be employed by attaching them to a strap in the manner of the preferred embodiment.

Now that the structure has been described, a cycle of operation will be outlined. With the vehicle traveling in a straight path, spur gear 14 is motionless and pinion 36 is positioned at the center of slot 44. Under these conditions, the head lamps 52 are directed straight ahead and their light beams are focused at the normal distance from the front of the automobile. When the car enters a left-hand turn, the steering rod 10 is rotated counterclockwise by the driver. This causes spur gear 14 to rotate relative to the driver in a counterclockwise direction and gears 16 to rotate in an opposite sense. The clockwise motion of each of the gears 16 is translated by means of control cable 18 to the journalled pinion 36. The clockwise rotation of the pinion moves the rack 38 to the right (as shown by the chain lines of FIGURES 3 and 4). In addition, the continuous engagement of pinion 36 with the surface of the toothed slot 44 which is concave relative to the pinion causes the movable rack to elevate (as can be most clearly seen with reference to the chain lines of FIGURE 3). The simultaneous lateral movement of rack to the right and its vertical motion are translated by the strap 48 and brackets 50 to the head lamps. Since the head lamps are pivotally mounted ahead of the bracket connection, the lamps are pivoted downwardly and to the left. When the turn is completed the steering wheel is turned to the right causing the rack to move to the left and downwardly thus causing the lamp to move to the right and upwardly until the neutral position is reached. It is obvious that a right turn follows just the opposite sequence as that just described.

From the system outlined it can be seen that a system has been devised wherein the head lamps of a vehicle may be moved concurrently both laterally and vertically in order to follow curves in the road and to concentrate the beams of light on the road at closer proximity to the front end of the vehicle than may be achieved by the use of low beam alone. The amount of lateral and vertical movement which may be achieved is a function of the gear and rack parameters.

It is obvious that such a system as that described diminishes safety problems prevalent in night driving beyond the systems of the prior art. It is equally obvious that the arrangement of the invention is compatible with lamps which may be switched between high and low beams. No adjustment problems are encountered by State inspection requirements since the head lamps may be adjusted accurately so long as the wheels are straight during adjustment.

The automatic head lamp control system disclosed herein is an example of an arrangement in which the inventive features of this disclosure may be utilized, and it will become apparent to one skilled in the art that certain modifications may be made within the spirit of the invention as defined by the appended claim.

I claim:

An automatic system for controlling the position of vehicle head lamps comprising: a steering rod for said vehicle, a first gear mounted on said steering rod for rotation therewith and a second gear in operative engagement with said first gear; a flexible control cable having one end connected to said second gear; a gear bracket attached to said vehicle, said bracket including forward and rear arms having aligned apertures therein; a pinion extending between said arms and having its opposite ends journaled by said bracket within said apertures, one end of said pinion being connected to the other end of said control cable; a rack continuously engaging said pinion at the opposite end thereof immediately adjacent said forward arm, said rack having a curved slot therein to define a surface which engages said pinion, said engaging surface being concave with respect to said pinion; a head lamp arrangement including at least one head lamp pivotally connected at its top, at the front portion thereof, to said vehicle; said head lamp being joined to said rack rearwardly of the pivotal connection to permit rotation of said steering rod to be translated into combined lateral and vertical movement of said head lamp arrangement.

References Cited by the Examiner

UNITED STATES PATENTS

| | | | |
|---|---|---|---|
| 1,099,874 | 6/14 | Dorward | 74—30 |
| 1,324,652 | 12/19 | Erhart | 240—62.51 |
| 1,393,278 | 10/21 | Gauntt | 240—61.6 |
| 1,808,039 | 6/31 | Hunter | 240—62.51 |

NORTON ANSHER, *Primary Examiner.*